United States Patent [19]

Muramoto et al.

[11] 4,443,117
[45] Apr. 17, 1984

[54] MEASURING APPARATUS, METHOD OF MANUFACTURE THEREOF, AND METHOD OF WRITING DATA INTO SAME

[75] Inventors: Yutaka Muramoto; Susumu Kobayashi; Hideo Ishizaka, all of Fujinomiya, Japan

[73] Assignee: Terumo Corporation, Tokyo, Japan

[21] Appl. No.: 302,824

[22] Filed: Jun. 16, 1981

[30] Foreign Application Priority Data

Sep. 26, 1980 [JP] Japan .................................. 55-134103
Jan. 12, 1981 [JP] Japan .................................... 56-2784

[51] Int. Cl.$^3$ .............................................. G01K 7/16
[52] U.S. Cl. ........................................ 374/1; 364/557;
374/165; 374/171
[58] Field of Search ..................... 73/1 R; 374/1, 165;
364/557, 170, 171

[56] References Cited

U.S. PATENT DOCUMENTS 3,657,926 4/1972 Munson et al. ........................ 374/1
3,877,307 4/1975 Georgi .
4,031,630 6/1977 Fowler .
4,198,676 4/1980 Varnum et al. ..................... 374/170
4,317,367 2/1982 Shonberger .......................... 374/165

FOREIGN PATENT DOCUMENTS 2002126 2/1979 United Kingdom .
2020037 11/1979 United Kingdom .
1579673 11/1980 United Kingdom .
1585744 3/1981 United Kingdom .
2072349 9/1981 United Kingdom .

Primary Examiner—S. Clement Swisher
Attorney, Agent, or Firm—Frishauf, Holtz, Goodman & Woodward

[57] ABSTRACT

A measuring apparatus is equipped with an input/output unit for delivering data to externally located equipment and for receiving data from the externally located equipment, or with an input unit for receiving data from the externally located unit, and is adapted to generate correlation data between data delivered by a sensing system provided within the measuring apparatus proper, and data delivered by a standard measurement system which can be disconnected from the measuring apparatus. The correlation data is generated by a data processing device located outside or located within the measuring apparatus, through the intermediary of the input/output unit or the input unit. The generated correlation data is stored, in non-volatile fashion, in a storage section located in the measuring apparatus, in such a manner that the data can be read out of the storage section in response to the data from the sensing system contained within the measuring apparatus.

23 Claims, 10 Drawing Figures

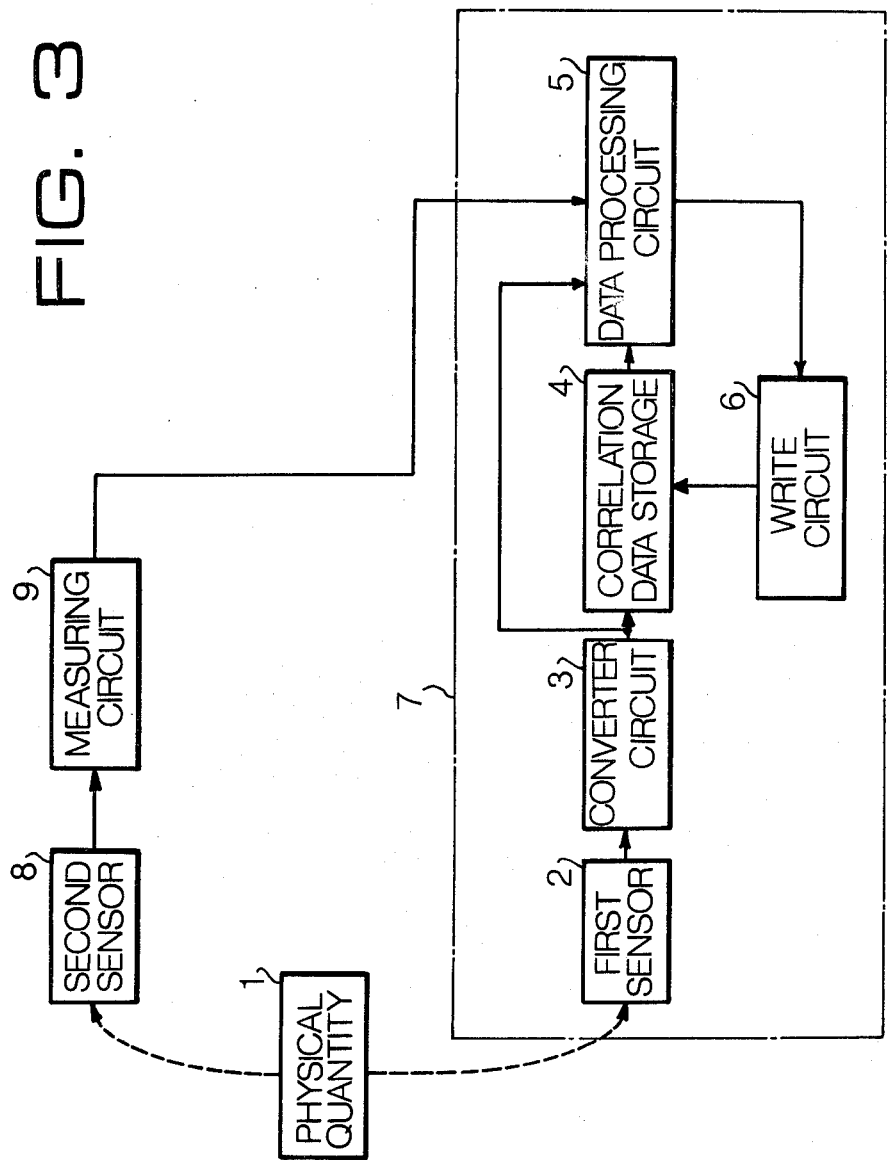

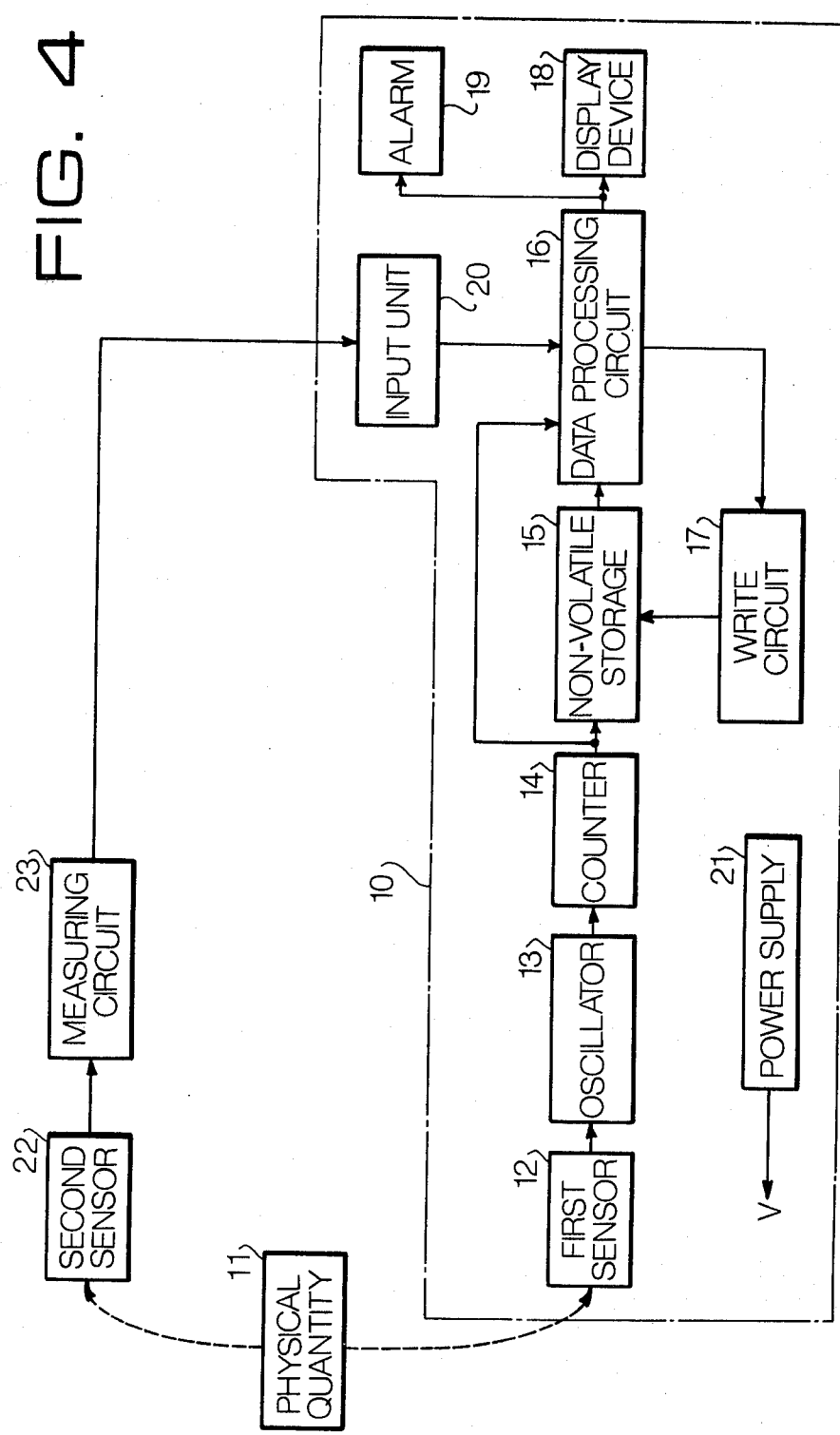

MEASURING APPARATUS, METHOD OF MANUFACTURE THEREOF, AND METHOD OF WRITING DATA INTO SAME

BACKGROUND OF THE INVENTION

This invention relates to an apparatus for measuring such physical quantities as temperature, humidity and velocity, to a method of manufacturing the apparatus, and to a method of writing correlative data into the apparatus.

A conventional digital thermometer, as previously disclosed in Japanese Patent Application Laid-Open No. 131576/75 and illustrated in FIG. 1, has a non-volatile storage element mounted thereon. In this example of the prior art, the non-volatile storage element stores correlation data, between temperature and the output value of a counter circuit, which is obtained in advance and then written into the non-volatile storage element. However, since a digital thermometer of this type is not equipped with an input/output unit for creating or for writing the correlation data, such data must be written into the non-volatile storage element off-line, and it is difficult to put the non-volatile storage element into the form of a large-scale integrated circuit together with the other principal circuit portions. Furthermore, since the sensing circuit used in writing the correlation data differs from the sensing circuit of the device on which the non-volatile storage section is mounted, it is difficult to create correlation data which is not influenced by the variance or dispersion in the electrical characteristics of the sensing circuit components. Lastly, the fact the correlation data is written into the non-volatile storage element off-line requires that the correlation data be so managed as not to mix with other data. Such management of data in the course of the writing process is complicated and requires particular care.

With the measuring apparatus as shown in FIG. 2, since the correlation characteristics between a physical quantity and the electrical parameters of a sensor are generally non-linear, a converting circuit (bridge circuit) is added to the sensor, thereby providing a linear output, in order to simplify the circuit which executes the subsequent signal processing. In addition, though there is a variance in the correlation characteristics between a physical quantity and the electrical parameters of separate sensors, the correlation characteristic can be standardized. This may be accomplished by using the variable resistors $VR_1$, $VR_2$, shown in FIG. 2, to regulate both the zero point and the amplitude of the linearized output of the bridge circuit, thereby standardizing the characteristic. Nevertheless, this method involves complex circuitry and a troublesome adjustment operation.

SUMMARY OF THE INVENTION

Accordingly, an object of the present invention is to eliminate the abovementioned shortcomings encountered in the prior art.

Another object of the present invention is to provide a measuring apparatus in which it is possible to write correlation data into a non-volatile storage element mounted on the apparatus together with the other circuit components.

Still another object of the present invention is to provide a measuring apparatus which is not influenced by a variance in the electrical characteristics between sensing circuits, and which does not require data management at the time of manufacture, and further to provide a method of manufacturing the apparatus as well as a method of writing the correlation data into the apparatus.

Yet another object of the present invention is to provide a method of manufacturing the measuring apparatus, as well as a data writing method, wherein correspondence is constantly maintained between a sensor and the correlation data produced by the sensor, thereby preventing writing errors due to mixing of correlation data.

A further object of the present invention is to provide a method of manufacturing a measuring apparatus, wherein the number of manufacturing steps can be reduced, by writing correlation data into a storage section previously incorporated in the measuring apparatus.

A further object of the present invention is to provide a measuring apparatus in which adjustments are not required in order to obtain precise output values.

These and other objects and features of the present invention will become more apparent in the following description and the accompanying drawings in which like numerals refer to like parts.

According to the first aspect of the present invention, there is provided a measuring apparatus which comprises:
correlation data generating means for delivering, to outside the apparatus, the output of a sensing system in order to generate correlation data between the output of said sensing system and a sensor output representative of a standard physical quantity;
substantially non-volatile storage means; and
data input means for retaining the generated correlation data in said substantially non-volatile storage means;
the correlation data retained in said substantially non-volatile storage means being read out of said storage means at the time of a measurement to obtain an output which corresponds to the input to said sensing system.

According to the second aspect of the present invention, there is provided a measuring apparatus which comprises:
a sensing system, disposed preceding said correlation data generating means, for sensing a physical quantity and for delivering a first signal, indicative of the physical quantity, to said correlation data generating means;
input means for receiving, from outside the apparatus, an input indicative of a standard physical quantity, and for delivering a second signal, indicative of said standard physical quantity, to said correlation data generating means;
said correlation data generating means generating correlation data between said first and said second signals;
substantially non-volatile storage means; and
means for delivering said correlation data to said substantially non-volatile storage means;
an output which corresponds to the input to said sensing system being obtained by utilizing said correlation data at the time of a measurement.

According to the third aspect of the present invention, there is provided a method of manufacturing a measuring apparatus which comprises the steps of:
generating correlation data between a first output of a first sensing system, wherein said first output is obtained from a first sensor, and a second output of a second sensing system which constitutes a standard measurement system, wherein said second output is obtained from a second sensor and represents a physical quantity, said first and said second sensors being placed under identical conditions with respect to the object of measurement;

writing said correlation data into a writable, substantially non-volatile storage section by write means; and disconnecting said second sensing system from said first sensing system;

thereby reading correlation data out of said storage section in response to an output from said first sensor which senses an unknown physical quantity, and obtained an output value which corresponds to the output of said first sensing system.

According to the fourth aspect of the present invention, there is provided a method of writing correlation data into the writable, substantially non-volatile storage section of a measuring apparatus of the type in which correlation data is read out of said storage section in response to the output of a sensor for sensing an unknown physical quantity, thereby obtaining an output value which corresponds to the output of said sensor, said method comprising the steps of:

generating correlation data between a first output of a first sensor and a second output of a standard measurement system which contains a second sensor, wherein said second output represents a physical quantity, said first and said second sensors being placed under identical conditions with respect to the object of measurement, and writing said correlation data into said substantially non-volatile storage section by write means.

BRIEF DESCRIPTION OF THE DRAWING

FIG. 3 is a block diagram showing, in simplified form, the construction of a measuring circuit embodying the present invention;

FIG. 4 is a block diagram showing the arrangement of FIG. 3 in greater detail;

DESCRIPTION OF THE PREFERRED EMBODIMENTS

Figure 1:
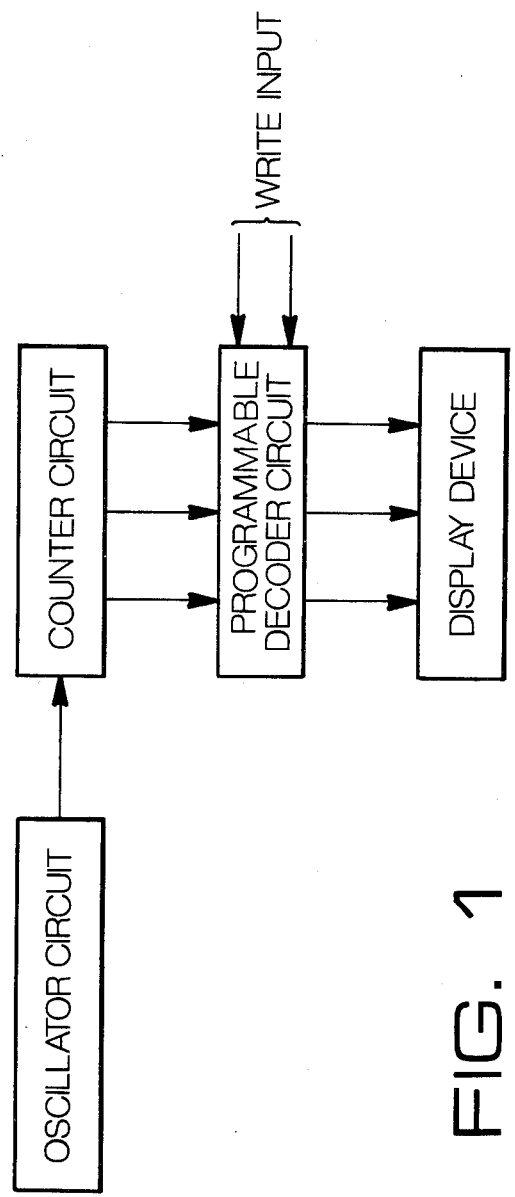
FIG. 1 is a block diagram showing the construction of a measuring apparatus according to the prior art.
Figure 2:
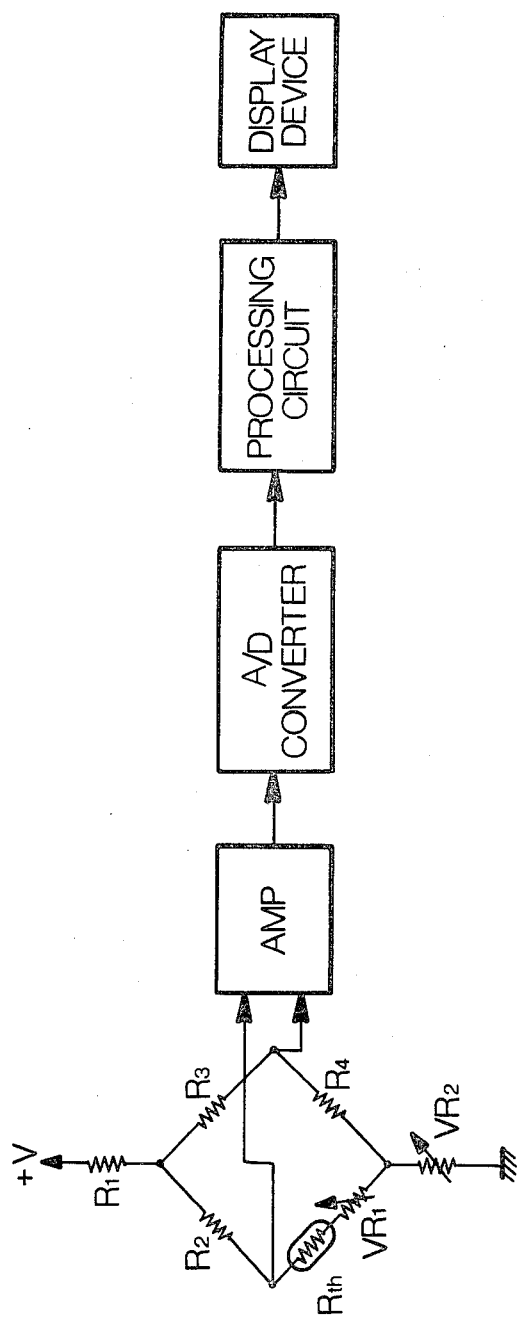
FIG. 2 is a block diagram showing another example of a measuring apparatus according to the prior art, the apparatus being provided with a converter circuit in order to obtain a linear output.

Referring now to FIG. 3, a measuring apparatus or circuit 7, of the present invention includes a first sensor 2 for sensing a first physical quantity 1 and for producing electrical parameters which correspond to the physical quantity. Further provided is a converter circuit 3 which receives the electrical parameters and converts them into electrical signals which are capable of being processed by a data processing circuit 5. The measuring circuit 7 further includes a correlation data storage section 4 which receives the output of the converter 3, and a write circuit 6 connected between the correlation data storage section 4 and the data processing circuit 5. Concurrent with the operation of the measuring apparatus 7 as described above, the physical quantity 1 is being measured using a second sensor 8 and a measuring circuit 9 belonging to an external, pre-calibrated standard measurement system. The electrical parameters of the second sensor 8, converted into a digital signal representative of the output value of the second sensor, are applied to the data processing circuit 5. The latter circuit is operative to derive correlation data between the output of the converter circuit 3 and the digital signal which represents the output value of the sensor 8, i.e., the value of the physical quantity 1. The correlation data is written into the correlation data storage section 4 through the write circuit 6 which is contained within the measuring apparatus 7. After the correlation data has been written into the storage section 4, the measuring circuit 9, connected between the second sensor 8 and the data processing circuit 5, is disconnected from the latter circuit and hence, from the measuring apparatus 7. An unknown physical quantity 1 may now be sensed by the first sensor 2 whose output is converted into a digital signal by converter circuit 3 for delivery to the correlation data storage section 4, thereby enabling the provision of a precise measurement signal, indicative of the physical quantity which is the object of the measurement, by means of the output from the system constituting the first sensor of the measuring apparatus.

Reference will now be had to FIG. 4 which illustrates an electronic clinical thermometer constituting a preferred embodiment of the present invention.

An electronic clinical thermometer 10 embodying the present invention includes a first sensor 12 comprising a thermistor for sensing a physical quantity 11 which is body temperature in the present case, and an oscillator circuit 13 and counter 14 which constitute a converter circuit. Further provided are a data processing circuit 16, contained within the clinical thermometer 10, which is adapted to derive correlation information between body temperature and the output of the counter 14, a write circuit 17, and a programmable non-volatile storage element 15 into which the derived correlation information is written through the write circuit 17, the storage element 15 and write circuit 17 both being incorporated within the thermometer 10. The data processing circuit 16, using the body temperature information provided by the non-volatile storage element 15, may compute anticipated body temperature, and retains the maximum body temperature in memory. In addition to the foregoing structural components, the electronic clinical thermometer includes a display device 18 for displaying the resulting body temperature, an alarm device 19 for providing an indication when a certain temperature has been computed by the data processing circuit 16, a power supply 21 for supplying the electronic clinical thermometer with electrical power, and an input unit 20. A measuring circuit 23, connected to a second sensor 22, has its output side connected to the clinical thermometer 10, as shown in FIG. 4, so that the output of the measuring circuit 23 enters the data processing circuit 16 through the input unit 20 which serves as an input interface to the electronic clinical thermometer 10. The thermometer 10 is connected through a connector provided in the input unit 20 to the measuring circuit 23. The electronic clinical thermometer 10 is manufactured through steps which include deriving the correlation information between the body temperature and the output of the counter 14, this being performed within the data processing circuit 16, and then writing the correlation information into the programmable nonvolatile storage element 15, contained in the electronic clinical thermometer 10, through the write circuit 17 which also is contained in the clinical thermometer 10.

Described next is a data processing method using the second sensor 22, measuring circuit 23 and the data processing circuit 16 of the present electronic clinical thermometer.

The first sensor 12 in the electronic clinical thermometer 10 is employed as a thermistor, as mentioned above. The oscillator 13 may, for example, employ the oscillator circuitry shown in FIG. 5, in which the oscillator is constructed to include the variable resistor $R_{th}$ of a thermistor, the oscillation frequency f of the oscillator varying in accordance with the change in temperature. The output of the oscillator 13 is applied to the counter 14 whose content is read at a constant period in response to a gating signal $T_G$ of a constant width. Thus, the change in the thermosensitive resistance of the thermistor in accordance with the change in temperature is read as a change in the output value N of the counter 14, the output value N being an electrical digital signal which is capable of being processed. The relation between the temperature and the output of the counter 14 under these circumstances may be understood from FIG. 6. Taking the physical quantity to be the temperature of an isothermic chamber, the temperature is measured by the system which includes the first sensor 12, the oscillator 13 and the counter 14 and is applied to the data processing circuit 16 as a digital signal. At the same time, the temperature of the isothermic chamber is measured under the same conditions using the second sensor 22 and the measuring circuit 23. The result of this measurement also is applied to the data processing circuit 16, in the form of a digital signal, through the input unit 20 of the electronic clinical thermometer.

When the first sensor 12 is a thermistor, as in the case described above, the change in its thermosensitive resistance $R_T$ due to the change in temperature is given by Equation (1) as follows:

$$R_T = R_0 e^{B(\frac{1}{T_T} - \frac{1}{T_0})} \quad (1)$$

where $R_0$ is the magnitude of the thermistor resistance at a standard temperature $T_0$, $R_T$ is the magnitude of the thermistor resistance at an arbitrary temperature $T_T$, e is the base of natural logarithm, and B is the constant of the thermistor.

Figure 6:
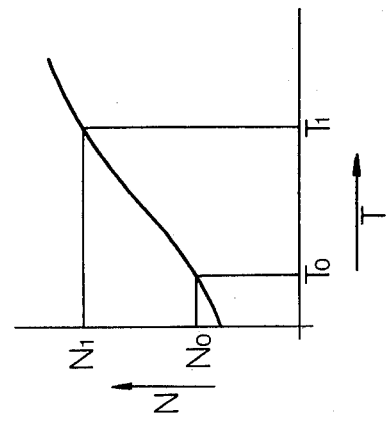
FIG. 6 is a characteristic curve of temperature T versus counter output N, in which the temperature T is plotted along the horizontal axis and the counter output N, indicative of oscillation frequency, is plotted along the vertical axis.
Figure 5:
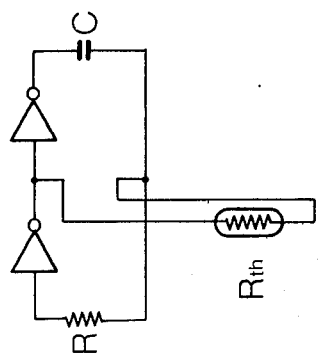
FIG. 5 is a circuit diagram of an oscillator circuit which employs a thermistor.

When an oscillator circuit of the type shown in FIG. 5 is employed, the oscillation frequency $f_T$ is given by Equation (2) as follows:

$$f_T = \frac{1}{2.2CR_T} \quad (2)$$

where $R_T$ is as defined in Equation (1), and C is the capacitance of the capacitor used in the oscillator circuit. From the above it may be understood that the oscillation frequency $f_T$ varies with a change in the thermosensitive resistance of the thermistor caused by a change in temperature. Since the output $N_T$ of counter 14 corresponds to the variation in the oscillation frequency $f_T$, the value of $N_T$ will vary in accordance with temperature, as illustrated in FIG. 6.

The next step in the data processing method is to set the temperature of the isothermic chamber to two given temperature values $T_0$ and $T_1$. If we let $N_0$ and $N_1$ denote the output values of counter 14 that correspond to the temperatures $T_0$, $T_1$, respectively, then the B constant of the thermistor may be obtained from Equation (3) written as follows:

$$B = \frac{\log_e \frac{N_0}{N_1}}{\frac{1}{T_1} - \frac{1}{T_0}} \quad (3)$$

$T_0$ and $T_1$ are read with high precision using the second sensor 22 and the measuring circuit 23. When the sets of data ($T_0$, $N_0$) and ($T_1$, $N_1$) enter the data processing circuit 16 incorporated within the electronic thermometer 10, the processing circuit 16 derives the B constant of the thermistor used in the thermometer, in accordance with Equation (3). Then, using the derived value of B, and in accordance with Equation (4) shown below, the data processing circuit 16 computes the relation between the temperature T and the counted value N over a required temperature range of $T_2$ to $T_3$ (such as 32° to 42° C.) at required temperature increments $\Delta T$ of, say, 0.1° C. Specifically, the equation relating the temperature and the value counted by the counter 14 may be expressed:

$$N_T = N_0 e^{-B(\frac{1}{TT} - \frac{1}{T_0})} \quad (4)$$

where $N_T$ is the counted value corresponding to the temperature $T_T$, $N_0$ is the counted value corresponding to the standard temperature $T_0$, i.e., $$N_0 = \frac{T_G}{2.2CR_0},$$

where $T_G$ is the gating interval of the counter 14. In this case $T_2$ and $T_3$ may coincide with $T_0$ and $T_1$, respectively, through they generally differ in practice.

Figure 7:
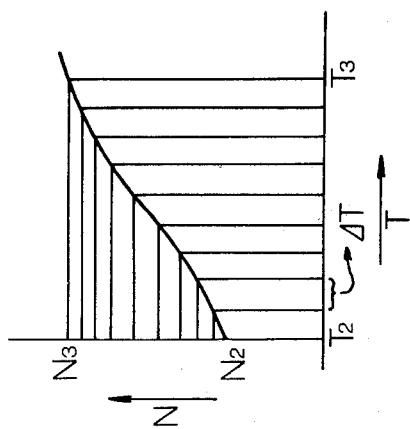
FIG. 7 is a graph showing the change in counter output from $N_2$ to $N_3$ corresponding to a change in temperature from $T_2$ to $T_3$.

Through the foregoing processing there is obtained a graph, shown in FIG. 7, giving the correspondence between counter values ranging from $N_2$ to $N_3$ and the change in body temperature ranging from $T_2$ to $T_3$. A table expressing this correspondence is stored in the memory of data processing circuit 16.

A flow chart expressing the foregoing data processing operation may be written as follows:

```
┌─────────────────────────────────────────┐
│ Read counter values N₀, N₁ corresponding│
│ to two reference temperatures T₀, T₁ of │
│ the isothermic chamber, and store data  │
│ sets (T₀, N₀), (T₁, N₁) in memory of    │
│ data processing circuit 16              │
└─────────────────────────────────────────┘
                    ↓
```

Derive B constant of thermistor by performing computation in accordance with $$B = \frac{\log_e \frac{N_0}{N_1}}{\frac{1}{T_1} - \frac{1}{T_0}}$$

using data sets $(T_0, N_0)$, $(T_1, N_1)$

↓

Increase $T_T$ from $T_{D1}$ to $T_{DN}$ by increments of $\Delta T$ in the equation $N_T = N_0 \times$ $$\exp\left[-B\left(\frac{1}{T_T} - \frac{1}{T_0}\right)\right]$$, thereby to obtain data sets $(T_{D1}, N_{D1})$, $(T_{D2}, N_{D2})$, $(T_{D3}, N_{D3})$, ..., $(T_{DN}, N_{DN})$, where $N_{D1}, N_{D2}, N_{D3}, ..., N_{DN}$ denote the results of computation in accordance with said equation, and retain these data sets in the memory of the data processing circuit 16

↓

Store each of the data sets $(T_{D1}, N_{D1})$, $(T_{D2}, N_{D2})$, $(T_{D3}, N_{D3})$, ..., $(T_{DN}, N_{DN})$ in non-volatile storage element 15 through write circuit 17, with $N_{D1}, N_{D2}, ..., N_{DN}$ serving as address data, and $T_{D1}, T_{D2}, ..., T_{DN}$ serving as the significant data indicative of temperature The effect of the foregoing data processing is to write a correspondence table, expressed by the graph in FIG. 7, into the non-volatile storage element 15 in such a manner that the temperature values can be read out of the storage element, with the addresses being $N_{D1}, N_{D2}, ..., N_{DN}$.

Figure 8:
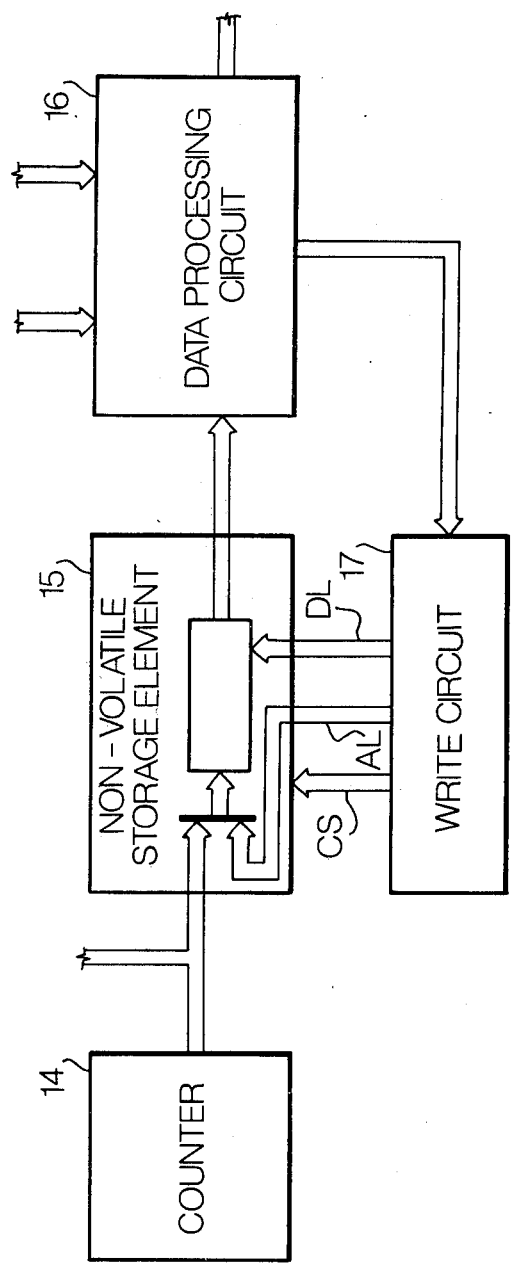
FIG. 8 is a block diagram useful in describing the details of write and read operations with respect to a non-volatile storage element.

The operation through which the data is written into the non-volatile storage element 15 will now be described with reference to FIG. 8.

The write circuit 17 is adapted to deliver a control signal on a control signal line CS to interrupt the input signal from the counter 14, and to designate a write address in the storage element 15 by delivering a write address signal on an address line AL. Next, the write circuit 17 feeds the temperature data to the storage element 15 over a data input line DL, and sends a write command to the storage element over the control signal line CS, thereby writing the temperature data, which is carried on the data input line DL, into the storage element. The foregoing operation performed by the write circuit 17 under the control of the data processing circuit 16 writes the data set $(T_{D1}, N_{D1})$ into the storage element 15. When this step has been completed, the above operation is repeated to write in the data set $(T_{D2}, N_{D2})$, with $T_{D2}$ being written in through data line DL, and $N_{D2}$ being written in through address line AL. It should be noted that an address changeover signal on the control signal line CS causes the storage element 15 to remain switched over to the write circuit side.

The write circuit employed in the present arrangement should be capable of supplying a write voltage of a level in accordance with the characteristics of the non-volatile storage element 15 which, incidentally, can be a RAM equipped with a power source. Any commercially available write circuit satisfying the above condition may of course be employed. Furthermore, instead of generating the correlation data by measuring two temperatures and then determining the intermediate temperatures by means of interpolation, the correlation data can be generated by varying the temperature of the isothermic chamber by increments of $\Delta T$ over a temperature range necessary for obtaining the sets of data having the corresponding counter values. It is possible also to form conversion parameters, as one variety of the data constituting the correlation data, in order to derive the temperature from the counter output.

The electronic clinical thermometer of the foregoing embodiment incorporates a data processing circuit and a write circuit. These latter circuits may, however, be provided external to the thermometer to reduce it in cost and size. Adopting such an arrangement means that the thermometer need not provide electric power for the write circuit.

Figure 9:
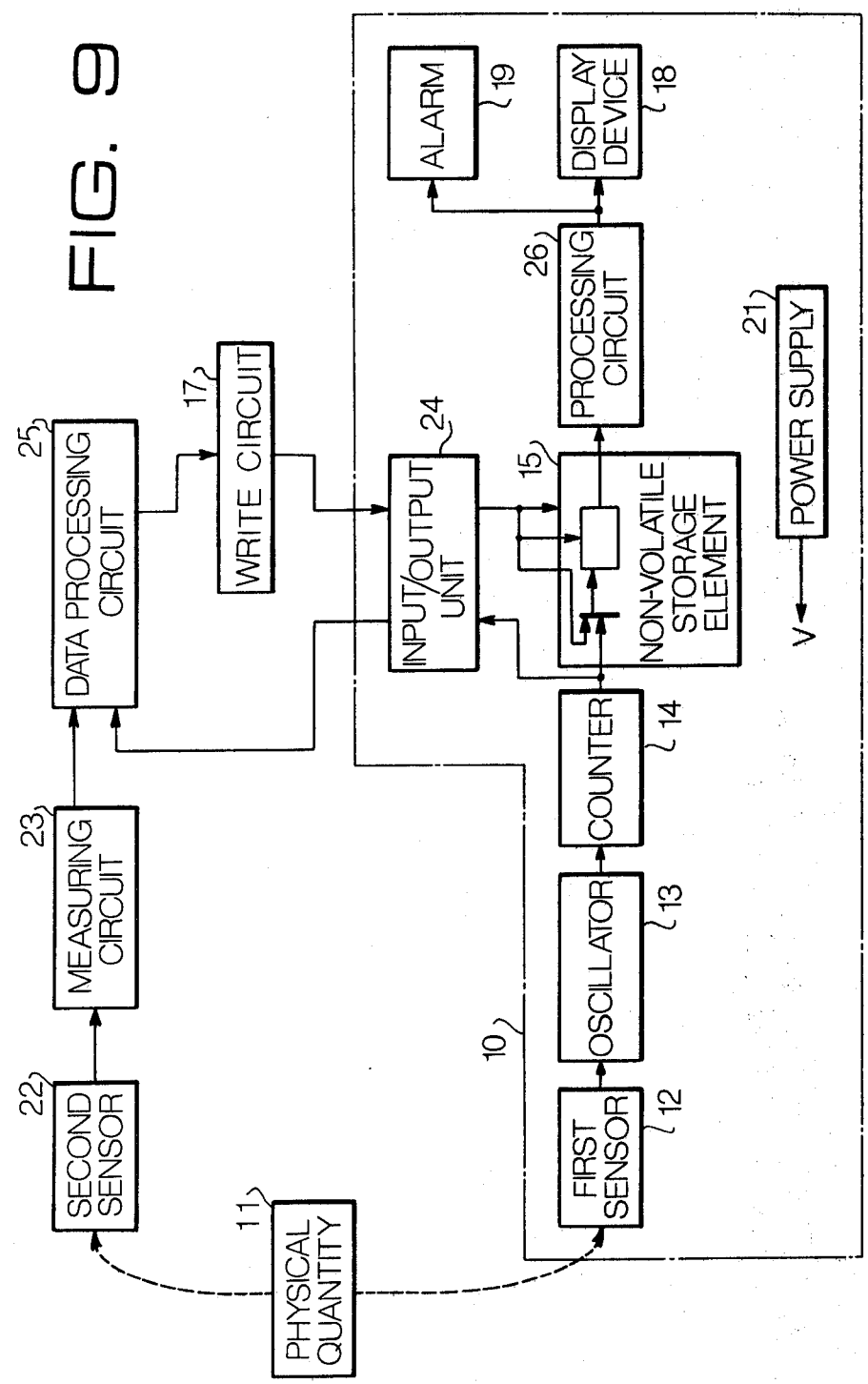
FIG. 9 is a block diagram illustrating another embodiment of a measuring apparatus according to the present invention.

FIG. 9 illustrates a second embodiment of the present invention. Temperature sensed by the first sensor 12 is represented as a change in the oscillation frequency of the oscillator 13 and the change in the value counted by the counter 14. In accordance with this embodiment, the value of the count is delivered through an input/output unit 24 to a data processing circuit 25 located outside the electronic thermometer 10. The data processing circuit 25 derives correlation data between the value from counter 14 and the output of the measuring circuit 23, the correlation data indicating body temperature. This data is written into the non-volatile storage element 15 through the write circuit 17, which is located outside the electronic thermometer 10 in this embodiment, and the input/output unit 24. The latter serves as the input/output interface of the electronic thermometer 10 and is connected through a connector provided in the input/output unit 24 to the input line from the write circuit 17 and to the output line to the data processing circuit 25. A processing circuit 26 computes the body temperature to be measured, and retains the maximum value of the body temperature. In this arrangement the processing circuit 26 is equipped with a microcomputer, a small number of registers and a memory for program storage.

In the embodiment of FIG. 9, data is written in to and read from the non-volatile storage element 15 in the same manner as described in connection with FIG. 8, and therefore will not be explained again here.

A method of manufacturing an electronic clinical thermometer in accordance with the present invention will now be described.

The relation between temperature and counter output for individual thermistors is written into the programmable non-volatile storage element, contained within the electronic clinical thermometer, through the steps described above. This provides a highly reliable and easily manufactured electronic clinical thermometer unlike those of the prior art which employ complicated circuitry and are troublesome to adjust owing to a variance in electrical characteristics among individual thermistors. Furthermore, the electronic clinical thermometer of the present invention includes the oscillator circuit 13 containing the first sensor 12, the counter 14, the data processing circuit 16 for deriving the information for the conversion from temperature to counted values, and for computing anticipated body temperature from the body temperature information as well as for retaining the maximum body temperature, the write circuit 17, the programmable non-volatile storage element 15 into which the conversion information is written, the display device 18 for displaying the resulting body temperature, the alarm device 19 which indicates when a resulting temperature has been attained, and the power supply 21 for supplying the electronic clinical thermometer with power. Since the oscillator circuit 13 which contains the first sensor 12, the counter 14, the programmable non-volatile storage element 15, the data processing circuit 16 and the write circuit 17 are all digital circuits, they can be put into the form of a large-scale integrated circuit with ease. Accordingly, low power consumption, small size and a reduction in cost can be achieved by manufacturing a large-scale integrated circuit, having the above circuit elements, of complementary metal oxide semiconductors.

Figure 10:
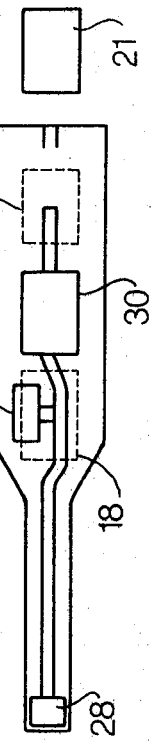
FIG. 10 is a block diagram showing the present measuring apparatus when constructed in the form of a clinical thermometer.

FIG. 10 shows an electronic clinical thermometer according to the present invention when fabricated using LSI techniques. A thermistor chip 28, constituting the first sensor, a chip 29 employed in the oscillator circuit, and a large-scale integrated circuit 30, mentioned above, are disposed on a base 27. The chip 29 includes a capacitor and resistor. Next, the circuit elements are soldered or wire-bonded to the printed patterns on the base 27. In order to prevent wire breakage and to protect the elements following the wire bonding of the LSI circuit 30, a junction coating technique is applied and then the base is molded within a molding material to form a unitary body of a desired external shape. Finally, the display device 18 and alarm device 19 are attached and a power supply is provided, thus completing the electronic clinical thermometer. Alumina, which has an excellent heat dissipating effect, is employed as the base 27 in order to permit the escape of the heat generated by the formation of the LSI circuit. This prevents warping and degradation of the base due to heat. In addition, a plastic film, such as polyimide resin, can be used for the portion of the base that contains the thermistor chip 28 (namely the portion of the thermometer brought into contact with, e.g., the armpit of the patient to measure his temperature), or for the entire base, in order to provide resilience thereto.

The measuring apparatus of the present invention, owing to its construction and operation as described above, permits correlation data to be written into a non-volatile storage element which is actually mounted within the apparatus. The measuring apparatus therefore lends itself to mass production and has circuit elements which can be put into the form of an LSI circuit. Furthermore, a measuring apparatus manufactured by employing the manufacturing method and data writing method of the present invention uses the same sensing system to generate the correlation data and to perform the actual measurement of a physical quantity, so there is no fluctuation in the electrical parameters of the sensing system and no adverse influence attributable to individual circuit components. This provides a measuring apparatus which is highly reliable.

In accordance with the present invention, the non-volatile storage element which stores the correlation data provided by the first and second sensing system can be constructed as a unitary body together with the first sensing system. Creation of the correlation data and the writing of the data into the storage unit therefore can be carried out simultaneously. This eliminates the need for data management and prevents writing errors due to mixing of correlation data. Moreover, though variance may be found in the sensor characteristics from apparatus to apparatus, and though the sensor output may be non-linear, the fact that the sensor output and the corresponding physical quantity are correlated allows an output value corresponding to the output of the first sensor system to be obtained without subsequent adjustment of the sensor.

As many apparently widely different embodiments of the present invention can be made without departing from the spirit and scope thereof, it is to be understood that the invention is not limited to the specific embodiments thereof except as defined in the appended claims.

What we claim is:

1. A measuring apparatus which comprises:
   data output means for delivering, to the outside of the apparatus, an output of a sensing system in order to generate correlation data between the output of the sensing system and a sensor output representative of a standard physical quantity;
   substantially non-volatile storage means;
   data input means for retaining the generated correlation data, wherein address-and-data sets generated on the basis of two different outputs of the sensing system are stored in said substantially non-volatile storage means; and
   a supporting base for unitarily supporting the sensing system, said data output means, said storage means and said data input means;
   the correlation data retained in said substantially non-volatile storage means being read out of said storage means at the time of measurement, wherein the output of the sensing system serves to address said storage means to obtain an output which corresponds to a physical quantity sensed by the sensing system.

2. A measuring apparatus according to claim 1, in which the sensing system includes a sensor and A/D conversion means for converting the output of said sensor into a digital signal.

3. A measuring apparatus according to claim 1, including A/D conversion means for receiving the output of the sensing system, and wherein said substantially non-volatile storage means and said A/D conversion means are together in the form of a large-scale integrated circuit.

4. A measuring apparatus according to claim 3, including a supporting base composed of a metallic enhanced heat-dissipating substrate for supporting said large scale integrated circuit.

5. A measuring apparatus according to any one of claims 1 or 2, in which the physical quantity to be measured by the sensing system is body temperature, the sensing system constituting a probe for sensing said body temperature.

6. A measuring apparatus which comprises:
   correlation data generating means;
   a sensing system, disposed preceding said correlation data generating means, for sensing a physical quantity and for delivering a first signal, indicative of the physical quantity, to said correlation data generating means;
   first input means for receiving, from outside the apparatus, an input indicative of a standard physical quantity, and for delivering s second signal, indicative of said standard physical quantity, to said correlation data generating means;

said correlation data generating means generating correlation data comprising address-and-data sets on the basis of two different physical quantities sensed by said sensing system;

substantially non-volatile storage means;

second input means for inputting correlation data generated by said correlation data generating means between said first and said second signals, to said substantially non-volatile storage means at said generated addresses; and a supporting base for unitarily supporting said sensing system, said first input means, said correlation data generating means, said storage means and said second input means for said storage means;

wherein the correlation data is read out at the time of measurement, with the input to said sensing system serving to provide an address for said storage means to obtain an output which corresponds to the physical quantity sensed by said sensing system.

7. A measuring apparatus according to claim 6, in which the sensing system includes a sensor and A/D conversion means for converting the physical quantity, sensed by said sensor, into a digital signal, the A/D conversion means, the correlation data generating means, the substantially non-volatile storage means and the input means being formed on said supporting base, wherein a display device, an alarm device and a power supply are attached to said supporting base.

8. A measuring apparatus according to claim 7, in which the A/D conversion means, the correlation data generating means, the substantially non-volatile storage means and the input means are together in the form of a large-scale integrated circuit.

9. A measuring apparatus according to claim 8, in which the supporting base is composed of an alumina substrate for enhanced heat dissipation.

10. A measuring apparatus according to any one of claims 6, 7, 8 or 9, in which the correlation data generating means and the means for delivering the generated correlation data to the substantially non-volatile storage means as an input thereto are provided within the measuring apparatus.

11. A measuring apparatus according to claim 10, in which the physical quantity to be measured is body temperature, the measuring apparatus constituting an electronic clinical thermometer for measuring said body temperature.

12. A measuring apparatus according to claim 11, in which the supporting base comprises a resilient film.

13. A method of manufacturing a measuring apparatus which comprises the steps of:

affixing a first sensing system and a writable, substantially non-volatile storage means on a supporting base;

arranging said first sensing system, wherein a first output is obtained from a first sensor, and a second sensing system which constitutes a standard measurement system, wherein a second output is obtained from a second sensor and represents a physical quantity, under identical conditions with respect to an object of measurement;

setting the object of measurement at at least two different temperatures;

generating correlation data for interpolating intermediate of the two measurement temperatures, between the output of said first sensing system and the output of said second sensor, wherein said correlation data forms a set with an address generated on the basis of the outputs of said first sensing system;

writing said correlation data into the writable, substantially non-volatile storage means at said address by write means;

switching over an output of said first sensing system to an address input of said storage means; and disconnecting said second sensing system from said first sensing system;

whereby correlation data is read out of said storage means in response to the first output from said first sensor which senses an unknown physical quantity and provides an address, to obtain an output value which corresponds to the first output of said first sensing system.

14. A method of manufacturing a measuring apparatus according to claim 13, in which correlation data generating means and said write means are contained in said first sensing system.

15. A method of manufacturing a measuring apparatus according to claim 13, in which correlation data generating means and said write means are contained in said second sensing system.

16. A method of manufacturing a measuring apparatus according to claim 13, in which the correlation data is a correspondence table comprising outputs from said first sensing system and outputs, representative of the physical quantity, from said second sensing system.

17. A method of manufacturing a measuring apparatus according to claim 13, in which the physical quantity to be measured is temperature, said first sensor comprising a thermistor for deciding the oscillation frequency of an oscillator circuit.

18. A method of manufacturing a measuring apparatus according to claim 17, in which said first sensor comprises a thermistor, the B constant of said thermistor being found from two oscillation frequencies of said oscillator circuit that correspond to two respective temperatures measured by said second sensing system, correlation data being generated using the B constant of said thermistor, said correlation data comprising a correspondence table giving the correspondence between oscillation frequency and temperature.

19. A method of manufacturing a measuring apparatus according to claim 17, in which the correlation data comprises conversion parameters for finding the temperature from the oscillation frequency.

20. A method of writing correlation data according to claim 17, in which correlation data generating means are provided within the measuring apparatus.

21. A method of writing correlation data according to claim 20, in which correlation data generating means are provided outside the measuring apparatus.

22. A measuring apparatus according to claim 10, in which the supporting base comprises a resilient film.

23. A method of writing correlation data into a measuring apparatus, which comprises the steps of:

affixing, onto a supporting base, a first temperature sensor including a thermistor for converting into a counted value the oscillation frequency of an oscillator which oscillates at a frequency dependent upon temperature and for producing a signal indicative of the counted value, and substantially non-volatile storage means which is addressed by said counted value;

arranging said first temperature sensor, and a standard measurement system which includes a second temperature sensor, so as to sense the same temperature of an object of measurement;

setting the object of measurement to at least two different temperatures;

computing a thermistor constant based upon the counted values at the two different measurement conditions and the temperatures obtained from the standard measurement system;

generating correlation data between the address and temperature on the basis of said thermistor constant;

writing said correlation data into said storage means, with the address; and switching over an output of said first temperature sensor to an address input of said storage means.

* * * * *